US006952196B2

(12) United States Patent
Weil et al.

(10) Patent No.: US 6,952,196 B2
(45) Date of Patent: Oct. 4, 2005

(54) METHODS AND SYSTEMS FOR PROVIDING PROGRAMMABLE COMPUTERIZED INTERACTORS

(75) Inventors: Emily Weil, New York, NY (US); Greg Thomas, Santa Cruz, CA (US); S. Joy Mountford, Mountain View, CA (US); Thomas J. Dougherty, Los Altos, CA (US); Daniel E. Cummings, San Francisco, CA (US)

(73) Assignee: Vulcan Patents LLC, Seattle, WA (US)

( * ) Notice: Subject to any disclaimer, the term of this patent is extended or adjusted under 35 U.S.C. 154(b) by 59 days.

(21) Appl. No.: 10/402,345

(22) Filed: Mar. 27, 2003

(65) Prior Publication Data

US 2004/0008182 A1 Jan. 15, 2004

Related U.S. Application Data (63) Continuation of application No. 09/991,132, filed on Nov. 16, 2001, now Pat. No. 6,556,184, and a continuation of application No. 09/056,223, filed on Apr. 7, 1998, now Pat. No. 6,356,255.

(51) Int. Cl.[7] .............................................. G09G 5/00
(52) U.S. Cl. ...................... 345/156; 434/156; 434/159
(58) Field of Search ................................. 345/156, 170, 345/177; 434/224, 156, 159; 446/91, 118, 484, 485; 273/238, 237

(56) References Cited

U.S. PATENT DOCUMENTS

| 4,341,385 A | 7/1982 | Doyle et al. |
| 4,597,495 A | 7/1986 | Knosby ...................... 382/232 |

(Continued)

FOREIGN PATENT DOCUMENTS

| DE | 3008190 A1 | 9/1981 |
| EP | 0576187 A1 | 6/1992 |

(Continued)

OTHER PUBLICATIONS

Wellner, et al, "Computer–Augmented Environments: Gack to the Real World Introduction", vol. 36, No. 7, Communications of the ACM, Jul. 1993.

(Continued)

*Primary Examiner*—Amare Mengistu
(74) *Attorney, Agent, or Firm*—Van Pelt, Yi & James LLP (57) ABSTRACT

A computerized interactor system uses physical, three-dimensional objects as metaphors for input of user intent to a computer system. When one or more interactors are engaged with a detection field, the detection field reads an identifier associated with the object and communicates the identifier to a computer system. The computer system determines the meaning of the interactor based upon its identifier and upon a semantic context in which the computer system is operating. One specific embodiment of the present invention is a bead interactor system that is a user playable sound and light show system. When an interactor bead is positioned within the detection space of the bead interactor system, a sound sequence begins and continues to play unaltered until the bead interactor is removed or other bead interactors are positioned within or removed from the detection space. Each bead represents a different sound and the row and column location of the bead within the detection space controls how the sound is modified, e.g., louder or softer, higher pitched or lower pitched, the period of play, etc. In some embodiments, the beads are translucent in order to conduct light from light sources located under each bead receptacle. The available sounds are determined not only by the identity of the beads and their positioning within the detection space and their associated states or orientations, but also by sound data stored in an accompanying computer readable medium. Hence a user can access a variety of sound collections by simply installing a different computer readable medium.

8 Claims, 7 Drawing Sheets

U.S. PATENT DOCUMENTS

| | | | |
|---|---|---|---|
| 4,843,568 A | 6/1989 | Krueger et al. | |
| 4,873,398 A | 10/1989 | Hubby, Jr. | |
| 4,968,255 A | 11/1990 | Lee et al. | 434/159 |
| 5,013,047 A * | 5/1991 | Schwab | 273/238 |
| 5,082,286 A | 1/1992 | Ryan et al. | |
| 5,088,928 A | 2/1992 | Chan | |
| 5,188,368 A | 2/1993 | Ryan | |
| 5,202,828 A | 4/1993 | Vertelney et al. | |
| 5,303,388 A | 4/1994 | Kreitman et al. | |
| 5,330,380 A | 7/1994 | McDarren et al. | |
| 5,452,414 A | 9/1995 | Rosendahl et al. | |
| 5,483,261 A | 1/1996 | Yasutake | |
| 5,511,148 A | 4/1996 | Wellner | |
| 5,586,216 A | 12/1996 | Degen et al. | |
| 5,604,516 A | 2/1997 | Herrod et al. | 345/168 |
| 5,636,995 A * | 6/1997 | Sharpe et al. | 434/317 |
| 5,729,251 A | 3/1998 | Nakashima | 364/514 |
| 5,739,814 A | 4/1998 | Ohara et al. | 345/173 |
| 5,779,515 A * | 7/1998 | Chung | 446/90 |
| 5,823,782 A | 10/1998 | Marcus et al. | 434/156 |
| 5,832,119 A | 11/1998 | Rhoads | 382/232 |
| 5,906,369 A * | 5/1999 | Brennan et al. | 273/238 |
| D410,972 S | 6/1999 | Sosoka, Jr. et al. | 434/159 |
| 6,190,174 B1 * | 2/2001 | Lam | 434/169 |
| 6,227,931 B1 * | 5/2001 | Shackelford | 446/268 |
| 6,443,796 B1 * | 9/2002 | Shackelford | 446/91 |
| 6,460,851 B1 * | 10/2002 | Lee et al. | 273/238 |
| 6,679,751 B1 * | 1/2004 | Maxwell et al. | 446/91 |

FOREIGN PATENT DOCUMENTS

| | | |
|---|---|---|
| EP | 0606790 A2 | 7/1994 |
| GB | 2103943 A | 7/1981 |
| GB | 2226468 A | 6/1990 |
| GB | 2237514 A | 5/1991 |
| JP | 4010743 | 1/1992 |

OTHER PUBLICATIONS

Spreitzer, et al, "Scalable, Secure, Mobile Computing with Location Information", vol. 36, No. 7, Communications of the ACM, Jul. 1993.

Baudel, Thomas, et al, "CHARADE: Remote Control of Objects using Free–Hand Gestures", vol. 36, No. 7, Communications of the ACM, Jul. 1993.

Kreuger, Myron W., "Environmental Technology: Making the Real World Virtual", vol. 36, No. 7, Communications of the ACM, Jul. 1993.

Fitzmaurice, George W., "Situated Information Spaces and Spatially Aware Palmtop Computers", vol. 36, No. 7., Communications of the ACM, Jul. 1993.

Azuma, Ronald, "Tracking Requirements for Augmented Reality", vol. 36, No1 7,Communications of the ACM, Jul. 1993.

Feiner, Steven, et al, "Knowledge–Based Augmented Reality", vol. 36, No. 7, Communications of the ACM, Jul. 1993.

Resnick, Mitchell, "Behavior Construction Kits", vol. 36, No. 7, Communications of the ACM, Jul. 1993.

Gold, Rich, "This is not a Pipe", vol. 36, No. 7, Communications of the ACM, Jul. 1993.

Weiser, Mark, "Some Computer Science Issues in Ubiquitous Computing", vol. 36, No. 7, Communications of the ACM, Jul. 1993.

Elrod, et al, "Responsive Office Environments", vol. 36, No. 7, Communications of the ACM, Jul. 1993.

Wellner, Pierre, "Interacting with Paper on the DigitalDesk", Vo. 36, No. 7, Communications of the ACM, Jul. 1993.

Mackay, et al, "Augmenting Reality: Adding Computational Dimensions to Paper", vol. 36, No. 7, Communications of the ACM, Jul. 1993.

Technical Description of Knufer's "Station", Mar. 1996.

Fitzmaurice G. W., et al, "Bricks: Laying the Foundation for Graspable User Interfaces" Human Factors in Computing Systems, CHI '95 Conference Proceedings, Denver, May 7–11, 1995, pp 442–449.

Tanigawa H., et al., "Personal Multimedia–Multipoint Teleconference System," Networking in the Nineties, Bal Harbour, vol. 3, Apr. 7, 1991, IEEE, pp. 1127–1134.

Bar Code Hotel, Nov. 1, 1998.

Polynor, Rick, "The Hand that Rocks the Cradle", May Jun. 1995 I.D.

Ishii, Hiroshi and Ullmer, Brygg, "Tangible Bits: Toward Seamless Interfaces betweenPeople, Bits and Atoms", Mar. 22–27, 1997, CHI.

Gorbet, Matthew G., Orth, Maggie, and Ishii, Hiroshi, "Triangles" Tangible Interface for Manipulation and Exploration of Digital Information Topography, Nov. 1, 1998, Triangles_CHI98.

Neurosmith "Music Blocks" Feb. 14, 2000.

Gorbet, Matthew G., Orth, Maggie and Ishii, Hiroshi, "Triangles" Tangible Interface for Manipulation and Exploration of Digital Information Topography, Apr. 18–23, 1998, Triangles_CHI98.

* cited by examiner

Figure 8

METHODS AND SYSTEMS FOR PROVIDING PROGRAMMABLE COMPUTERIZED INTERACTORS

CROSS-REFERENCE TO RELATED APPLICATION

This application claims priority to U.S. patent application Ser. No. 09/056,223 now U.S. Pat. No. 6,356,255 entitled "METHODS AND SYSTEM FOR PROVIDING PROGRAMMABLE COMPUTERIZED INTERACTIONS" filed Apr. 7, 1998, which is incorporated herein by reference for all purposes.

This application is a continuation of U.S. patent application Ser. No. 09/991,132 now U.S. Pat. No. 6,556,184 entitled "METHODS AND SYSTEM FOR PROVIDING PROGRAMMABLE COMPUTERIZED INTERACTORS" filed Nov. 16, 2001, which is incorporated herein by reference for all purposes.

BACKGROUND OF THE INVENTION

This invention relates generally to computer interfaces and more particularly to computerized interactor systems that utilize user programmable interactors for providing computer interfaces.

People are constantly interacting with computerized systems, from the trivial (e.g., the computerized toaster or the remote control television) to the exceedingly complex (e.g., telecommunications systems and the Internet). An advantage of computerization is that such systems provide flexibility and power to their users. However, the price that must be paid for this power and flexibility is, typically, an increase in the difficulty of the human/machine interface.

A fundamental reason for this problem is that computers operate on principles based on the abstract concepts of mathematics and logic, while humans tend to think in a more spatial manner. Often people are more comfortable with physical, three-dimensional objects than they are with the abstractions of the computer world. In short, the power and flexibility provided by the computer and related electronic technology are inherently limited by the ability of the human user to control these devices. Since people do not think like computers, metaphors are adopted to permit people to effectively communicate with computers. In general, better metaphors permit more efficient and medium independent communications between people and computers. The better metaphor will provide the user a natural and intuitive interface with the computer without sacrificing the computer's potential.

There are, of course, a number of computer interfaces which allow users, with varying degrees of comfort and ease, to interact with computers. For example, keyboards, computer mice, joysticks, etc. allow users to physically manipulate a three-dimensional object to create an input into a computer system. However, these computer interfaces are quite artificial in nature, and tend to require a substantial investment in training to be used efficiently.

Progress has been made in improving the computer interface with the graphical user interface (GUI). With a GUI, icons that represent physical objects are displayed on a computer screen. For example, a document file may look like a page of a document, a directory file might look like a file folder, and an icon of a trash can may be used for disposing of documents and files. In other words, GUIs use "metaphors" where a graphical icon represents a physical object familiar to users. This makes GUIs easier for most people to use. GUIs were pioneered at such places as Xerox PARC of Palo Alto, Calif. and Apple Computer, Inc. of Cupertino, Calif. The GUI is also often commonly used with UNIX™ based systems, and is rapidly becoming a standard in the PC/MS-DOS world with the Windows™ operating system provided by Microsoft Corporation of Redmond, Wash.

While GUIs are a major advance in computer interfaces, they nonetheless present a user with a learning curve due to their still limited metaphor. In other words, an icon can only represent a physical object; it is not itself a physical object. It would be ideal if the computer interface was embodied in a physical medium which could convey a familiar meaning, one perhaps relevant to the task at hand.

Recognizing the problems, a number of researchers and companies have come up with alternative computer interfaces which operate on real-world metaphors. Some of these concepts are described in the July, 1993 special issue of *Communications of the ACM*, in an article entitled "Computer Augmented Environments, Back to the Real World." Another example is the electronic white boards of Wacom and others where ordinary-looking erasers and markers are used to create an electronic "ink." Wellner describes a "DigitalDesk" that uses video cameras, paper, and a work station to move between the paper and the electronic worlds. Fitzmarice has a "Chameleon" unit which allows a user to walk up to a bookshelf and press a touch-sensitive LCD strip to hear more about a selected book. Finally, MIT Media Lab has a product known as Lego/Logo which lets children program by snapping plastic building blocks together, where each of the building blocks includes an embedded microprocessor.

Bishop has developed a "marble answering machine" which appears to store a voice mail message in a marble that drops into a cup. The marble, in fact, triggers a pointer on a small computer which stores the message. To play back the message, the marble is dropped into the machine again. This marble answering machine has been publicly known at least as of June, 1993.

While strides have been made in attempting to improve computer interfaces, there is still progress to be made in this field. Ultimately, the interface itself should disappear from the conscious thought of users so that they can intuitively accomplish their goals without concern to the mechanics of the interface or the underlying operation of the computerized system.

SUMMARY OF THE INVENTION

The present invention improves the human-computer interface by using "interactors." An interface couples a detection field to a computer system which, in turn, may be coupled to other systems. When an interactor is entered into the detection field, moved about within the detection field, or removed from the detection field, an event is detected which, when communicated to the computer system, can be used to create a control signal for either the controller computer system or to a system connected to the controller computer system. Preferably, the detection field is suitably sized and configured so that multiple users can simultaneously access the field and such that multiple interactors can be engaged with the field simultaneously.

By "interactor" it is meant that a physical, real world object is used that can convey information both to the controller computer system and to users. An interactor can provide identity (ID) information and other state information to the computer through a resistor, an embedded computer chip, a bar code, etc. An object can also be made into an interactor by embedding higher-level logic, such as a program logic array, microprocessor, or even a full-blown microcomputer. An interactor forms part of a system wherein information is assigned by users to at least one object.

According to a first embodiment of the present invention, a computerized interactor system has a detection space, at least one physical interactor which can be manually placed within and removed from the detection space, and an interface. This physical interactor has an identity and a user programmable state variable, and the interface responds to the physical interactor by providing an interactor signal indicative of the identity and the programmable state variable.

In related embodiments, the computerized interactor system also has a computer system that processes the interactor signal to create a control input that is indicative of the identity and/or the programmable state variable. Coupled to the computer system is a computer readable medium storing application data. This application data defines both an identity mapping between each interactor identity and a corresponding interactor identity computer instruction, and a position mapping between each of the plurality of positions and a corresponding position computer instruction. The computer readable medium may be one of a number of different removable computer readable mediums available, each one providing different data and perhaps even a different type of application.

For example, one embodiment of the present invention teaches that the identity computer instructions are sound instructions and that the plurality of interactors each represent a playable sound sequence. Similarly, the position computer instructions are sound modification instructions such that the positions each represent a particular sound modification characteristic. In this case, the computer system has an amplifier and a speaker and will play sound in accordance with the identity and position mappings and the control input generated due to the arrangement of the plurality of interactors at the plurality of positions of the detection space.

In yet another embodiment of the present invention, the computerized interactor system includes an overlay template attachable to cover one or more of the plurality of positions. This overlay template provides content to a user of the computerized interactor system, and can be used to implement a variety of different applications.

By way of example, the overlay template could represent a fill-in-the-blank text having at least one blank overlapping some positions but exposing others. In this case, the interactor identity computer instructions could each represent a word, and when an interactor is inserted into an exposed position, the computer system can sound out the fill-in-the-blank text, inserting the word represented by the inserted interactor. Alternatively, rather than simply reading text aloud, the interactor system would play a chosen sound or other media for each of the blanks provided in the overlay.

Another embodiment of the present invention teaches a user playable sound system. The playable sound system has a plurality of interactors each having an identity specified by identification circuitry, a detection array, an interface, a computer readable medium storing application data, and a digital processor coupled to the interface. The detection array has multiple spots for engaging the interactors in order to at least temporarily connect the identification circuitry of the interactor with internal circuitry of the detection space.

The interface responds to the disposition of interactors within the detection array and provides an interactor signal indicative of the identity and position of each interactor disposed within the detection array. The application data stored on the computer readable medium storing defines both an identity mapping between each interactor identity and a corresponding interactor identity instruction, and a position mapping between each of the plurality of positions and a corresponding position instruction. The digital processor executes a sound sequence dependent upon the interactor signal and the application data.

Yet another embodiment of the present invention teaches an interactor suitable for manually placing within a detection space of a computerized interactor system. The interactor has identity circuitry defining an identity of the interactor, a light conduit arranged to conduct light through the interactor, and user programmable state circuitry defining a state of the interactor.

One aspect of the present invention teaches a computer implemented method allowing a user to control an application executing on a computer system through the use of a plurality of physical interactors that can be manually placed within a detection space coupled to the computer system. This control method includes providing a computer readable medium storing data and operating instructions suitable for use in controlling the computer system, reading application instructions into memory of the computer system, and generating a play array that includes data corresponding to a position and an identity of each interactor positioned within the detection space. The control method also repeatedly executes an action based upon the play array and the application instructions, monitors to determine whether an event has occurred that requires updating the play array, and updates the play array when an event occurs that requires such an update. Events requiring an update include an interactor interrupt and a software interrupt, the interactor interrupt corresponding to one of i) the insertion of a particular interactor into the detection space and ii) the removal of the particular interactor from the detection space. In addition to having an identity parameter, each interactor may also have one or more variable parameters that may be adjustable by the user, or may vary depending upon other circumstances. The control method can utilize the parameter values in executing the application. In these cases, when the control method determines that a parameter value has changed, an interrupt would effectuate a change in the play array.

These and other advantages of the present invention will become apparent upon reading the following detailed descriptions and studying the various figures of the drawings.

DETAILED DESCRIPTION OF THE PREFERRED EMBODIMENTS

Figure 1:
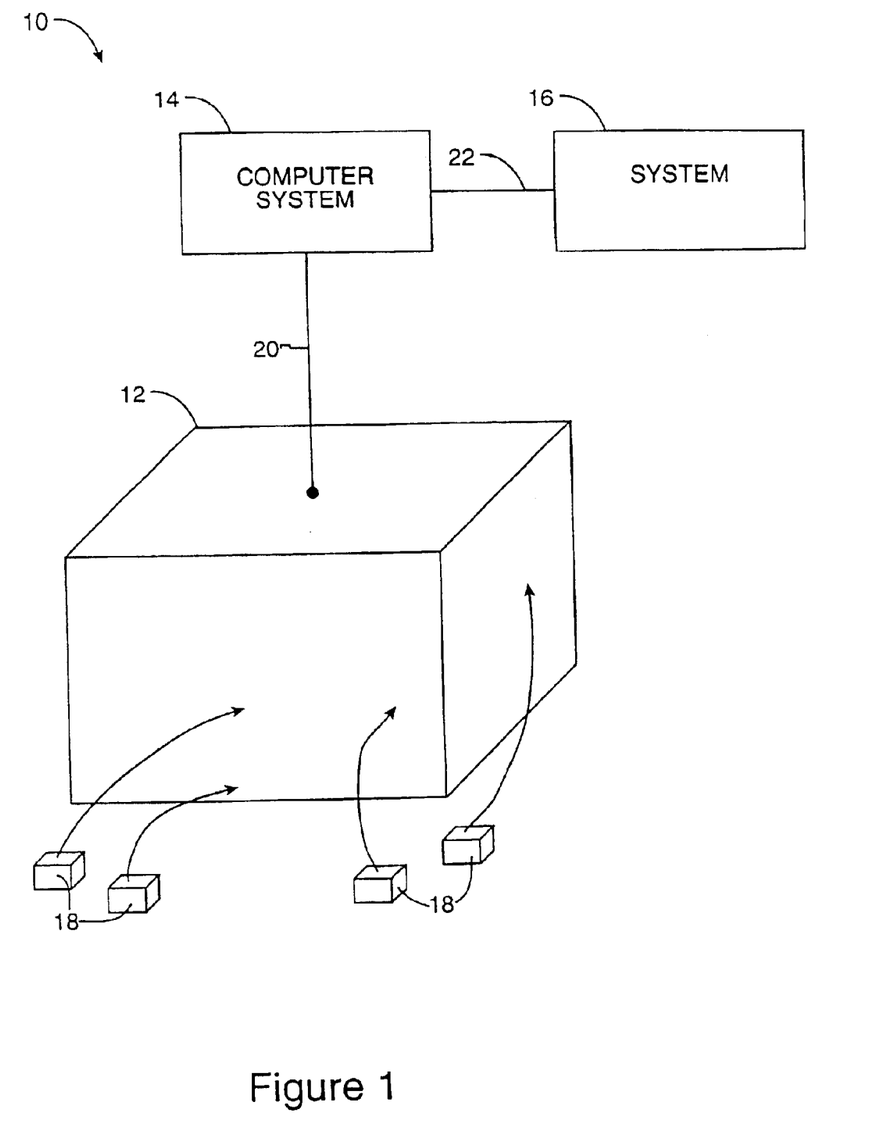
FIG. 1 is a pictorial representation of an interactor system in accordance with the present invention.

In FIG. 1, an interactor system 10 includes a detection space 12, a controller computer system 14, and an optional system 16. A number of interactors 18 (which will be discussed more fully hereafter) may be engaged with, moved around in, and removed from the detection space 12. The interactors 18 in conjunction with the detection space 12 allow the user to program and control operation of the computer system 14 via tangible, meaningful objects and thus help define a computer interface that is intuitive, flexible and rich in meaning. As used herein, the terms "detection space," "detection field," "detection array" or the like will refer to any n-dimensional space in the physical world.

The computer system 14 may be a general purpose microcomputer made by any one of a variety of computer manufacturers. For example, computer system 14 can be a Macintosh computer system made by Apple Computer, Inc. or a PC/AT compatible DOS or Windows computer system made by Compaq, IBM, Packard-Bell, or others. Alternatively, the computer system 14 may be an application specific integrated circuit (ASIC) or a programmable integrated circuit (PIC) designed or programmed for the particular application.

The computer system 14 is coupled to the detection space 12 as indicated at 20 such that it may receive information concerning an interactor 18 placed within the detection space 12. An interface is provided between the detection space 12 and the computer system 14. The interface may be internal to either the detection space 12 or the computer system 14, or may be separate from both. In some embodiments, the interface, the detection space 12, and the computer system 14 are all housed in a single package. The interface is responsive to the disposition and identity of interactors placed within the detection space 12. Depending upon the specific embodiment, the interface can determine parameters such as an interactor's position and orientation within the detection space 12 and position and orientation between different interactors placed within the detection space 12. Some preferred implementations of interfaces of the present invention will be discussed in greater detail subsequently.

By coupling the optional system 16 to the computer system 14, the interactors 18 and the optional system 16 can interact via controller computer system 14. The system 16 may serve as an input to computer system 14, an output from computer system 14, or both. When used as an input to computer system 14, the system 16 can provide data on a line 22 which is used in conjunction with data on line 20 derived from the interaction of an interactor 18 with the detection space 12. Communication lines 20 and 22 may be either unidirectional or bidirectional, as required. When used as an output from the computer system 14, the system 16 can be controlled by the interaction of the interactor 18 with the detection space 12. The system 16 can be of a standard commercial design (e.g. a videotape or compact disc player), or can be a custom system designed for a particular use.

Each interactor 18 has an identity that may be measured by the detection space 12 and/or the interface. The computer system 14 maintains an identity mapping between each interactor identity and a corresponding interactor identity computer instruction. The computer system 14 further maintains a position mapping between each distinct measurable position of the detection space 12 and a corresponding position computer instruction. Thus each interactor has a particular meaning and the computer system 14 will respond in accordance with the arrangement of different interactors within the detection space.

In preferred embodiments, the identity and position mappings change with each software application executed by the computer system 14. For example, a removable computer readable medium storing application data (e.g., the different mappings) can be installed for each application. The computer system can then load up the available mappings and implement the particular application.

Figure 2:
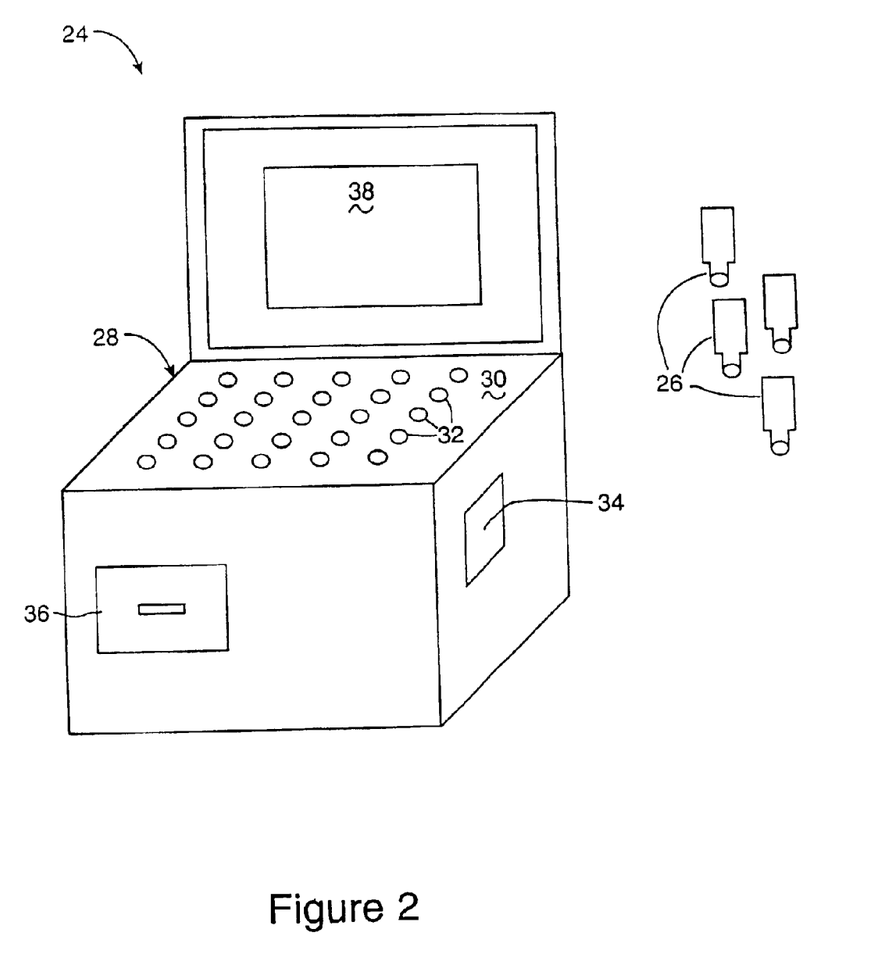
FIG. 2 is a pictorial illustration of a beadbox interactor system in accordance with one embodiment of the present invention.
Figure 3:
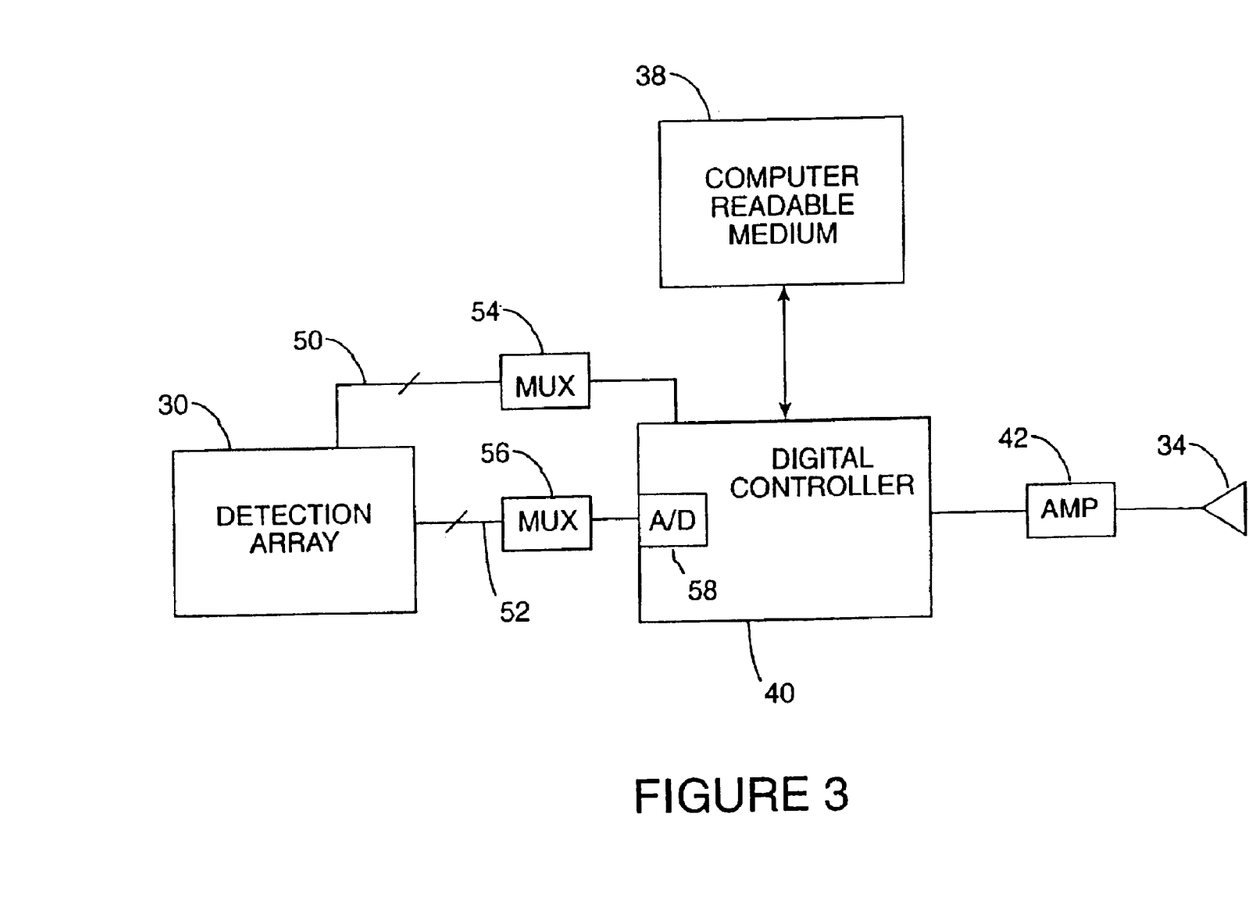
FIG. 3 is a diagrammatic illustration of one suitable embodiment of circuitry required to implement the beadbox interactor system of FIG. 2.

A beadbox interactor system 24 that is a user playable sound and light show system is illustrated in FIGS. 2 and 3. FIG. 2 illustrates one physical embodiment of the beadbox interactor system 24 including interactor beads 26 and a physical beadbox 28. The beadbox 28 has a detection field 30 that in this instance includes a 5×5 array of bead receptacles 32, a speaker 34, a bead drawer 36 and a removable computer readable medium 38 such as a CD-ROM or a ROM integrated circuit. With the beadbox interactor system 24, a user can play sounds or music in a personal setting according to the user's selection and positioning of the interactor beads 26.

When an interactor bead 26 is placed into a bead receptacle 32, the beadbox interactor system 24 begins and continues to play a predefined sound until the bead 26 is removed. Each bead 26 represents a different sound and the row and column location of the bead 26 within the array 30 controls how the sound is modified, e.g., louder or softer, higher pitched or lower pitched, the period of play, etc. In some embodiments, the beads 26 are translucent in order to conduct light from light sources located under each bead receptacle 32. The available sounds are determined not only by the identity of the beads 26 and their disposition within the array 30, but also by sound data stored in the computer readable medium 38. Additionally, there can be many types of mappings of the physical layout to the output parameters, thereby supporting a variety of different pitch, reverberation, delay or other desired sound effects. Hence a user can access a variety of sound collections by simply installing a different computer readable medium 38.

FIG. 3 illustrates diagrammatically one suitable embodiment of circuitry required to implement the beadbox interactor system 24 of FIG. 2. In FIG. 3, the beadbox interactor system 24 includes a detection array 30, a digital controller 40, a computer readable medium 38, an amplifier 42 and a speaker 34. A column bus 50 and a row bus 52 couple the detection field 30 to the digital controller 40 through a pair of multiplexers 54 and 56. Thus with a single analog-to-digital (A/D) converter 58 the entire detection array 30 can be scanned to measure the electrical signal present at each bead receptacle 32. One suitable method for determining when interactor beads 26 have been inserted into the detection array 30, measuring the values of the detection array 30 and producing sounds and lights accordingly is described below with reference to FIGS. 6–7.

Figure 4:
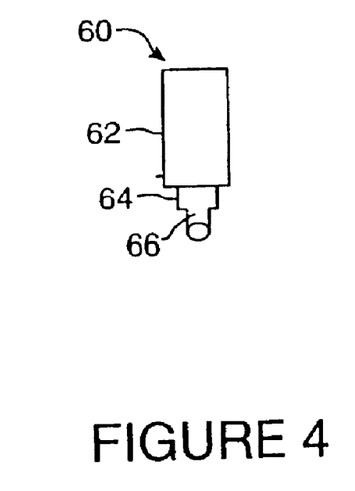
FIG. 4 is a pictorial illustration of an interactor bead in accordance with another embodiment of the present invention.

FIG. 4 illustrates an interactor bead 60 in accordance with one embodiment of the present invention. The interactor bead 60 includes a translucent body 62, an electrical conductor 64, and a light conductor 66. The interactor bead 60 is designed for insertion into the bead receptacles 32 such that when inserted, the electrical conductor 64 completes certain circuitry of FIG. 3. In some embodiments the electrical conductor 64 is simply a resistor of a predefined value signifying the identity of the bead 60. The light conductor 66 enables light generated underneath the inserted bead 60 to conduct up through the translucent body 62. Note that the body 62 of the interactor bead 60 can take many forms, being fully transparent, partially opaque, etc.

Figure 5:
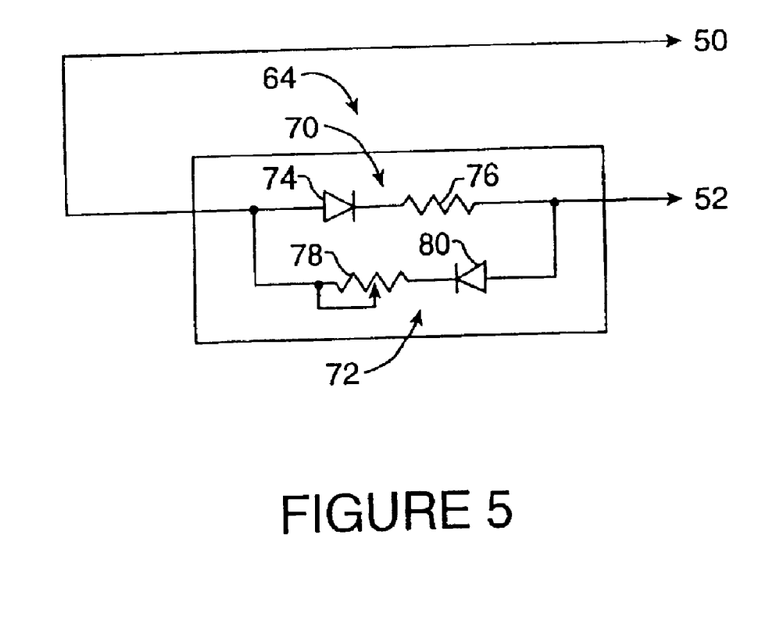
FIG. 5 is a circuit diagram of an interactor conductor in accordance with yet another embodiment of the present invention.

FIG. 5 illustrates schematically an electrical conductor 64 in accordance with another embodiment of the present invention. The electrical conductor 64 includes a first electrical pathway 70 having a first diode 74 connected in series with a first resistor 76, and a second electrical pathway 72 having a variable resistor 78 connected in series with a second diode 80. The first electrical pathway 70 is connected in parallel with the second electrical pathway 72. The first and second diodes are connected such that depending on the voltage potential, at any instance current will flow through only one of the first and second electrical pathways 70 and 72. Thus by alternating the voltage potential, one is able to alternate measuring the values of both the first resistor 76 and the variable resistor 78.

The incorporation of a variable resistor 78 into the electrical conductor 64 allows a user to further program the operation of a beadbox interactor system 24. The variable resistor 78 is user manipulable, typically in real time, enabling the user to adjust the value of variable resistor 78 while the beadbox interactor system 24 is operating. The beadbox interactor system 24 can respond to the user adjusting the variable resistor 78 by either sensing the user adjustment and taking a discrete, specific action, or by continuously adjusting operation corresponding to the user adjustment. The mechanism allowing the user to adjust the variable resistor could, e.g., be a knob or squeeze grip transducer arranged conveniently on the interactor bead 60. Of course, regardless of the form the interactor takes (bead or otherwise), the electrical conductor of FIG. 5 could be incorporated therein.

Figure 6:
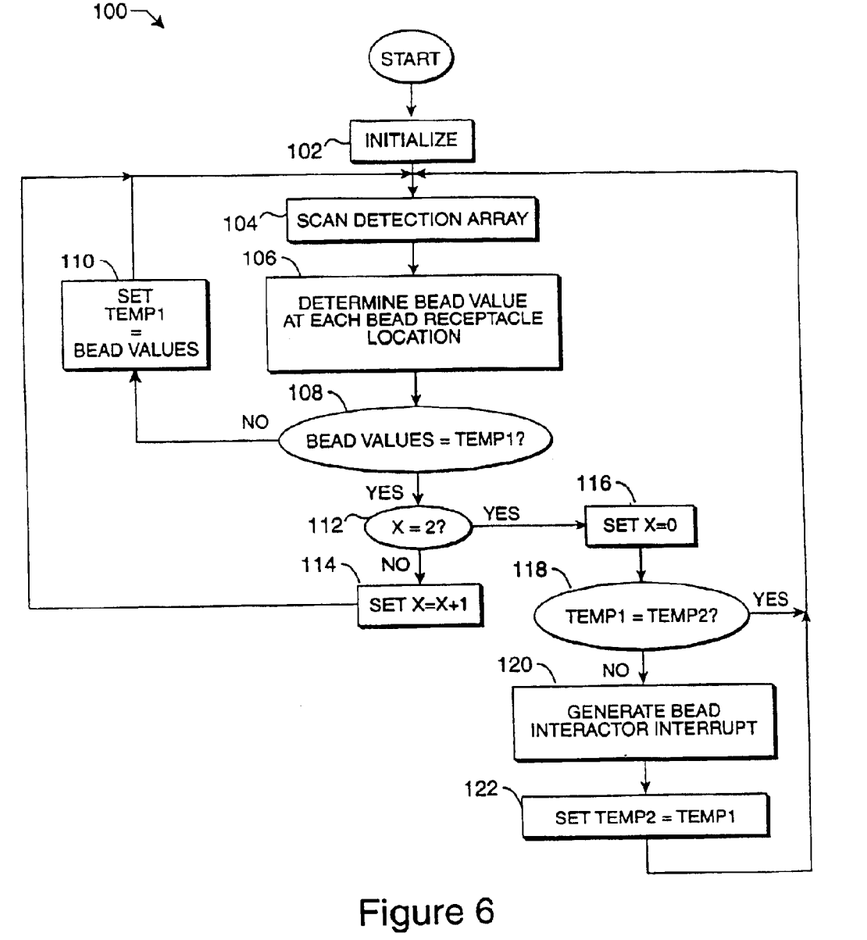
FIG. 6 is a flow chart illustrating a method for generating a bead interactor interrupt in accordance with the present invention.

FIG. 6 is a flowchart illustrating a method 100 for generating a bead interactor interrupt. In brief, a bead interactor interrupt is generated whenever an interactor is inserted or removed from the detection space. As will be appreciated by those skilled in the art, the method 100 includes a "debounce" procedure in order to confirm the measurements made during scanning. To accomplish the debounce procedure, the method 100 utilizes the variables bead values (BV), TEMP1, TEMP2, and X. BV, TEMP1, and TEMP2 are arrays whose element have a one to one correspondence to the bead receptacles 32. The values in BV correspond to the currently measured values at the bead receptacles 32. TEMP1 is a variable used for determining whether the values in BV have satisfied the debounce condition. Specifically, as will be described below, TEMP1 is used as a sort of place holder to determine whether the values in BV have been constant for at least two scans of the detection array 30. TEMP2 is a variable that stores the bead receptacle values that are used in implementing the light and sound show. The variable X is a counter variable used to determine whether BV has been constant for two scans.

An initialization step 102 performs any initialization processes necessary to begin scanning a detection array 30 in order to measure the presence and identity of beads inserted into the detection array 30. Step 102 includes zeroing X, and the elements of BV, TEMP1, and TEMP2. A first substantive step 104 scans the detection array 30 and a step 106 determines a bead value at each bead receptacle 32, storing these values in the array BV. Then a step 108 determines whether the array BV equals the array TEMP1. When BV does not equal TEMP1, control is passed to a step 110 wherein TEMP1 is set equal to the values in BV. After completion of step 110, process control is returned to the scan step 104 where the process of scanning the detection array is begun again.

When the step 108 determines that BV equals TEMP1, control is passed to a step 110 wherein it is determined whether X equals 2. When X does not equal 2, control is passed to a step 114 where X is set equal to X plus 1. When X does equal 2, this indicates that the values in TEMP1 have satisfied the debounce condition. Accordingly, control is passed to a step 116 where X is set equal to zero, enabling the scanning process to proceed. Then a step 118 determines whether TEMP1 equals TEMP2. A determination that TEMP1 equals TEMP2 indicates that no changes have been made within the detection array 30. Accordingly, when TEMP1 equals TEMP2, control is passed back to the scan step 104 where the process of scanning the detection array 30 starts again. However, when TEMP1 does not equal TEMP2, at least one change has been made within the detection array 30. Accordingly, step 120 generates a bead insertion interrupt to indicate to the sound and light show software that the play sequence must be updated. Then in a step 122, TEMP2 is set equal to TEMP1 and control is passed back to the scan step 104.

As mentioned above, certain embodiments of the present invention provide interactors that have, in addition to identification circuitry, one or more user programmable state variables. It will be apparent to those skilled in the art that the determination of the values of such state variables can be achieved using a method similar to the method 100 of FIG. 6. A method to determine the state variables could be implemented to utilize additional interface circuitry, and thus run in parallel with the execution of method 100. Alternatively, a method to determine the state variables could be incorporated within the method 100. In any event, when the interactor system determines that a value of a state variable has changed, the system would generate a parameter change interrupt prompting the application software to respond appropriately.

Figure 7:
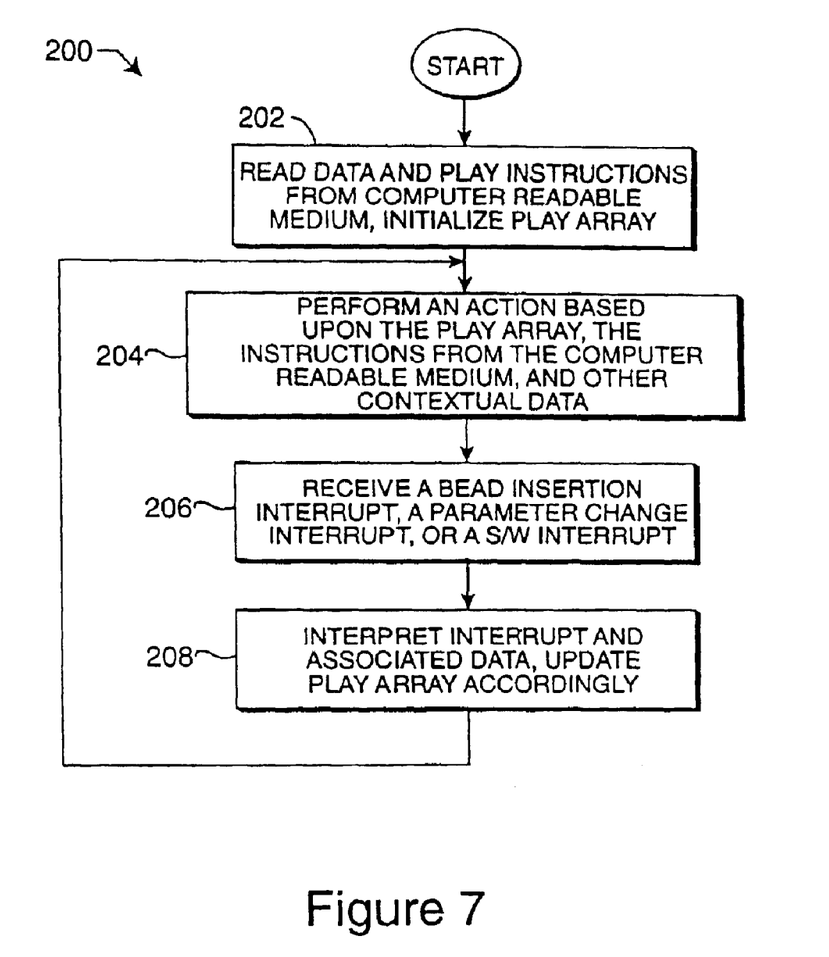
FIG. 7 is a flow chart illustrating a method for playing a sound according to one aspect of the present invention.

FIG. 7 is a flowchart illustrating one method 200 for playing a sequence in accordance with one embodiment of the present invention. The sequence will be defined by a play array representing parameters (interactor identity, position, and state variable values) controlled by the user, as well as data and play instructions present in a computer readable medium 38. In a first step 202, the digital controller 40 reads data and play instructions from the computer readable medium 38. Then, in a step 204, the digital controller 40 performs an action based upon the play array, the data and play instructions, and any other relevant contextual information. For example, a background or introductory music and light show sequence may begin playing initially when no beads are inserted into the detection array 30. Alternatively, the bead box interactor system 24 could simply go into a wait state, ready to respond to the insertion of a new interactor bead 26. When one or more beads are present, the action in step 204 would involve the selection of the sound(s) sequence and light state to be implemented based upon the play array, and then the selected sequence would begin playing continuously.

In a step 206, the method 200 receives an interrupt such as a bead interactor interrupt, a parameter change interrupt, or a software interrupt. A next step 208 interprets the interrupt and any associated data received and updates the play array accordingly. Once the play array is updated, control is passed back to step 204 where a new action is performed based upon the updated play array. For example, the now modified play array may alter the sequence being played in some manner. In preferred embodiments, the receipt of an interrupt does not interrupt play of the sequence. The sequence continues to play in a process executing parallel to the method 200 of FIG. 7. However, the interrupt and more specifically the new play array may alter the nature of that sequence.

Figure 8:
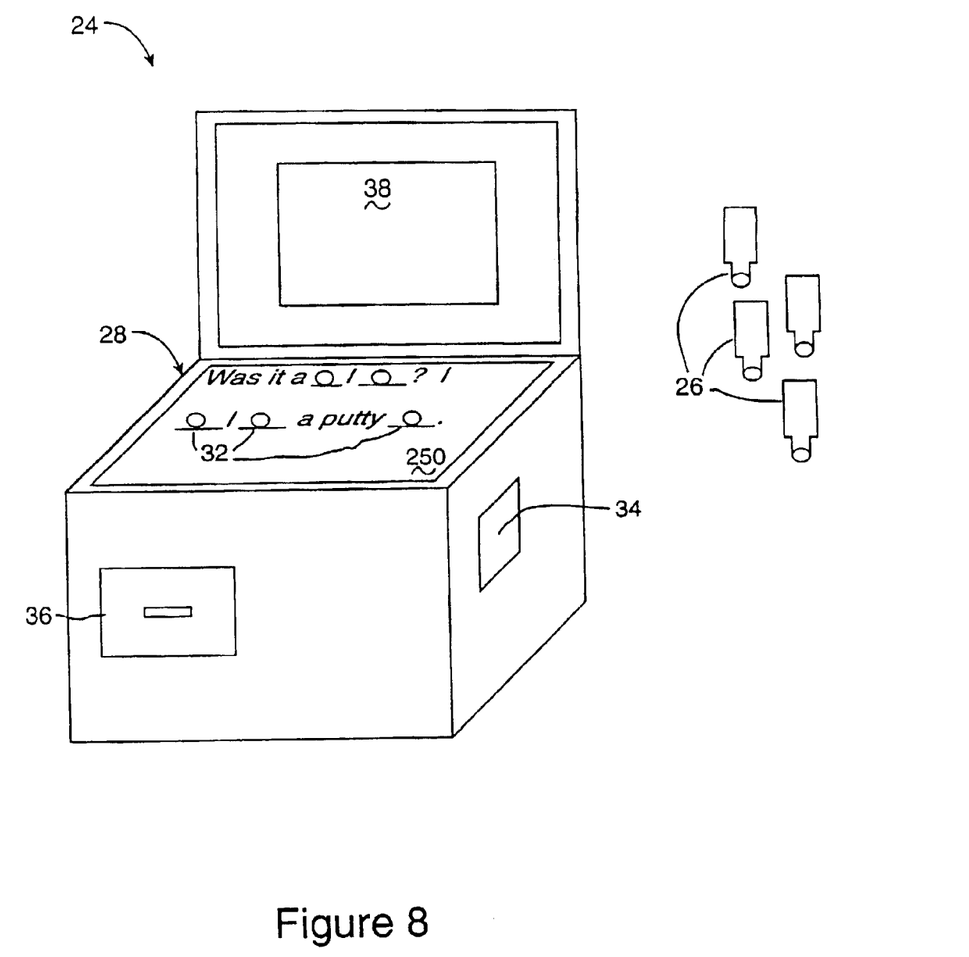
FIG. 8 is a pictorial illustration of a beadbox interactor system having an overlay template in accordance with a further embodiment of the present invention.

FIG. 8 illustrates one example of the use of an overlay template 250 together with the beadbox interactor system 24 of FIG. 2 in accordance with another aspect of the present invention. As described above, the data and play instructions provided in the computer readable medium 38 define the application implemented by the beadbox interactor system 24, the user inserting the interactor beads to, in essence, program the operation of the application implemented by the beadbox interactor system 24. The overlay template 250 serves to further define the operation of the beadbox interactor system 24, as well as provide content and context to the user.

In the specific embodiment of FIG. 8, the overlay template 250 provides a "fill in the blank" text, commonly referred to as a "madlib." The blanks present within the overlay template 250 correspond to and expose several different bead receptacles 32. A user would be provided a set of interactor beads 26 that would represent a variety of nouns, verbs, adjectives, etc. The user would then select and insert desired interactor beads 26 into blank bead receptacles 32 thereby completing the sentences. Once completed, the beadbox interactor system 24 would "read" out loud the completed sentence inserting into the blanks the words represented by the corresponding interactor beads 26. Alternatively, rather than simply reading text aloud, the beadbox interactor system would play a chosen sound for each of the blanks filled into the MadLib overlay. It is contemplated that each madlib computer readable medium would come with a number of different overlay templates 250, storing the different text and/or sounds for each page. The identity of each overly template 250 could be determined by the position of the blanks, or by an identity interactor bead that was inserted into a particular position.

The implementation of an interactor system 10 such as the beadbox interactor system 24 can conceptually be divided into two separate sensing and application components. The sensing component involves performing accurate sensing of the states and positions of the interactors 18. The application component involves providing the underlying application that the interactor system 10 is intended to interface with and control. The application component would typically interpret the sensed data and provide feedback to the user. While separate implementation of the sensing and application components is not mandatory, it may be helpful for a variety of reasons. By way of example, for a particular interactor system 10, the process of sensing and compiling the interactor data would likely be the same regardless of the particular application. In contrast, each application may or may not have significant similarities. Along these lines, it is contemplated that certain interactor systems will have the sensing component executed as a separate process from the application component. The sensing component could be stored in ROM fixedly attached within the computer system, while the application component could be provided in the removable computer readable medium.

While this invention has been described in terms of several preferred embodiments and some specific examples, there are further alterations, permutations, and equivalents which fall within the scope of this invention.

The concept of the beadbox interactor system 24, described above with reference to FIGS. 2–7, can be expanded to cover a variety of applications. For example, the overlay template could be related to a mystery or puzzle game. Placing the interactor into a certain position could give the user a clue related, perhaps, to the content of the overlay template. Assume the overlay template were a clock. Then the interactors could be surrogate clock-hands and insertion into a particular position would give the user a time-related clue. Alternatively, the overlay template could be the floor-plan of a house and insertion into a particular position would give the user a clue related to that location. Further, the template could be used for storytelling using layered sounds, or as an aid in teaching reading and music.

It is further contemplated that the interactors can be designed with a plurality of user programmable state variables that could include even a sound recording medium. These features would allow users to personalize their interactors and exchange them among friends. These personalized interactors could be used for sending messages to or playing games with other users.

Certain interactor systems are envisioned as multi-user interactor systems. The multi-user interactor systems would include multiple detection spaces coupled to one or more computer systems. Control of the one or more computer systems could then be effected by the placement of interactors by multiple users.

The interactor system of the present invention can be thought of as a physical tool for programming the execution of a computer system. Take, for example, the operation of the beadbox system 24. By arranging interactor beads within the detection array, the user is able to program the beadbox system 24 to operate as desired. In another suitable context, Adams et al.'s aforementioned patent application describes a system for controlling a music synthesizer by mapping a small number of continuous range sensor signals into a larger number of control signals that are then used to control the music synthesis operations of the music synthesizer. It is contemplated that the signal mapping functions can be programmed via one embodiment of the interactor system of the present invention. For further details regarding this particular music synthesizer, please see Adams et al.'s patent application.

The variety of implementations contemplated for the present invention are extensive. For example, the beadbox sound system could utilize a genetic algorithm to continuously mutate the music. In this case, the two axis of the bead receptacles correspond to two parent genetic input forms and the mutations would be activated by the placement of beads. As another example, the user can access update information over the Internet, downloading new sounds, text, etc., as desired. Still further, the detection space can take any suitable form such as a hexagonal or circular grid, or may be a 3-dimensional detection space having several layers of grids or a spherical grid.

It is therefore intended that the following appended claims be interpreted as including all such alterations, permutations, and equivalents as fall within the true spirit and scope of the present invention.

What is claimed is:

1. An interactor system for programming a computer system, the interactor system enabling a user to program the computer system through the manipulation of physical objects, the interactor system comprising:

a plurality of interactors each having an identity specified by identification circuitry;

a detection array comprising an internal circuitry, including a plurality of positions at which an interactor may be selectively, manually, removably placed in order to at least temporarily connect the identification circuitry of the interactor with the internal circuitry of the detection array;

an interface responsive to the disposition of interactors within the detection array, the interface operable to provide an interactor signal indicative of the identity and position of each interactor disposed within the detection array; and a computer readable medium storing application data defining an identity mapping between each interactor identity and a corresponding interactor identity instruction, the application data further defining a position mapping between each of the plurality of positions and a corresponding position instruction, wherein the operation of a the computer system coupled to the interface and the computer readable medium is programmed according to the interactor signal and the application data to provide an output, and wherein the output is associated with the interactor identity instruction, and the position instruction determines a characteristic of the output.

2. An interactor system as recited in claim 1 wherein the plurality of positions within the detection array are discrete positions of a finite number.

3. An interactor system as recited in claim 1 wherein the interface is further responsible to the orientation of interactors within the detection array and the interactor signal is further indicative of such orientation.

4. An interactor system as recited in claim 1 wherein the detection array is a first detection array available to a first user, the interactor system further comprising a second detection array available to a second user, and the operation of the computer system is programmed according to the placement of interactors within both the first and second detection arrays thereby enabling multi-user programming of the computer system.

5. An interactor system as recited in claim 1 wherein the output is a sound and the characteristic is an effect of the sound.

6. An interactor system as recited in claim 1 wherein the output is a sound and the characteristic is the volume of the sound.

7. An interactor system as recited in claim 1 wherein the output is a sound and the characteristic is the pitch of the sound.

8. An interactor suitable for manually placing within a detection space of a computerized interactor system, the interactor comprising:

an identity circuitry configured to provide the computerized interactor system with an identity of the interactor and a position of the interactor within the detection space; and a user programmable state circuitry responsive to the computerized interactor system, configured to receive user control input and provide a state of the interactor;

wherein upon receiving the user control input, the user programmable state circuitry causes an interrupt to be generated for the computerized interactor system and wherein the identity circuitry includes a first resistor connected in series with a first diode, the user programmable state circuitry includes a variable resistor connected in series with a second diode, the identity circuitry and the user programmable state circuitry are connected in parallel at a first node and a second node, and the first and second diodes are arranged such that a nonzero voltage potential applied across the first and second nodes results in current flowing through only one of the identity circuitry and the user programmable state circuitry.

* * * * *